United States Patent
Mirtorabi et al.

(10) Patent No.: US 8,040,795 B2
(45) Date of Patent: Oct. 18, 2011

(54) BACKUP PATH CONVERGENCE IN THE APS ENVIRONMENT

(75) Inventors: Sina Mirtorabi, Santa Clara, CA (US); Mukhtiar Shaikh, San Jose, CA (US); Abhay Kumar Roy, Santa Clara, CA (US); Yousuf Hasan, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 11/431,873

(22) Filed: May 10, 2006

(65) Prior Publication Data
US 2007/0263532 A1    Nov. 15, 2007

(51) Int. Cl.
*G01R 31/08* (2006.01)
*H04L 12/28* (2006.01)

(52) U.S. Cl. ........ 370/220; 370/228; 370/254; 370/390; 370/395.51

(58) Field of Classification Search .................. None
See application file for complete search history.

(56) References Cited

U.S. PATENT DOCUMENTS

| | | | |
|---|---|---|---|
| 6,269,452 B1 | 7/2001 | Daruwalla et al. | |
| 6,430,700 B1 | 8/2002 | Daruwalla et al. | |
| 6,473,421 B1 | 10/2002 | Tappan | |
| 6,567,380 B1 | 5/2003 | Chen | |
| 6,603,756 B1 | 8/2003 | Tappan | |
| 6,615,362 B1 | 9/2003 | Daruwalla et al. | |
| 6,820,210 B1 | 11/2004 | Daruwalla et al. | |
| 6,876,660 B1 | 4/2005 | Hughes et al. | |
| 6,882,626 B1 | 4/2005 | Marathe et al. | |
| 6,883,034 B1 | 4/2005 | Pelavin et al. | |
| 6,956,816 B1 * | 10/2005 | Alexander et al. | 370/222 |
| 6,992,975 B1 | 1/2006 | Daniel et al. | |
| 7,031,252 B1 | 4/2006 | Hosler et al. | |
| 7,035,262 B1 | 4/2006 | Joshi | |
| 7,043,541 B1 | 5/2006 | Bechtolsheim et al. | |
| 7,124,187 B1 * | 10/2006 | Kodialam et al. | 709/226 |
| 7,779,065 B2 * | 8/2010 | Gupta et al. | 709/202 |
| 2002/0110136 A1 * | 8/2002 | Wakai et al. | 370/419 |
| 2002/0114031 A1 * | 8/2002 | Yamada | 359/119 |
| 2003/0076857 A1 * | 4/2003 | Morita et al. | 370/466 |
| 2003/0117950 A1 * | 6/2003 | Huang | 370/220 |
| 2003/0118024 A1 * | 6/2003 | Lee et al. | 370/395.1 |
| 2004/0081154 A1 | 4/2004 | Kouvelas | |

(Continued)

OTHER PUBLICATIONS

E. Rosen and Y. Rekhter, "BGP/MPLS VPNs," Request for Comments 2547, Mar. 1999.

(Continued)

*Primary Examiner* — Huy Vu
*Assistant Examiner* — Brandon Renner
(74) *Attorney, Agent, or Firm* — Cesari and McKenna, LLP

(57) ABSTRACT

A SONET network terminated by routers includes working paths and backup paths. The routers pre-establishes in their link state data bases the links in both for both the working and backup paths. However, the links involved in the backup paths are given higher costs, then the links working paths, that the routers select only the links in the working path. If there is a failure in a link in a working path, an APS arrangement provides rapid switchover of the optical links so as to substitute one or more links in the corresponding backup path. This is accomplished by changing the relative costs of the working and backup links involved, so that the routers select the backup links for their routing tables.

18 Claims, 5 Drawing Sheets

U.S. PATENT DOCUMENTS

| | | | |
|---|---|---|---|
| 2004/0156390 A1 | 8/2004 | Prasad et al. | |
| 2004/0157598 A1* | 8/2004 | Parkman | 455/427 |
| 2004/0233859 A1* | 11/2004 | Martin | 370/254 |
| 2005/0025075 A1 | 2/2005 | Dutt et al. | |
| 2005/0141415 A1 | 6/2005 | Broberg et al. | |
| 2006/0040524 A1 | 2/2006 | Liao et al. | |
| 2006/0045024 A1 | 3/2006 | Previdi et al. | |
| 2006/0098660 A1* | 5/2006 | Pal et al. | 370/395.51 |
| 2006/0126500 A1* | 6/2006 | Wakai et al. | 370/218 |
| 2006/0153067 A1* | 7/2006 | Vasseur et al. | 370/217 |
| 2006/0209895 A1* | 9/2006 | Hirota | 370/469 |
| 2006/0268749 A1* | 11/2006 | Rahman et al. | 370/256 |
| 2007/0183317 A1* | 8/2007 | Vasseur et al. | 370/225 |
| 2007/0217419 A1* | 9/2007 | Vasseur | 370/392 |

OTHER PUBLICATIONS

Coltun, R., "The OSPF Opaque LSA Option," Request for Comments 2370, Jul. 1998.

Callon, Ross W., "Use of OSI IS-IS for Routing in TCP/IP and Dual Environments," Request for Comments 1195, Dec. 1990.

Moy, J., "OSPF Version 2," Request for Comments 2328, Apr. 1998.

Tanenbaum, Andrew S., "Computer Networks," Fourth Edition, Section 1.4.2 pp. 41-44, 2003.

Perlman, Radia, "Interconnections Second Edition: Bridges, Routers, Switches, and Internetworking Protocols," Chapter 9, pp. 189-220, 2000.

Thomas, Stephen A., "IP Switching and Routing Essentials," Chapter 7, pp. 221-243, 2002.

James Guichard et al., U.S. Patent Application for a "Hierarchical Label Distribution for Inter-Area Summarization of Edge-Device Addresses" U.S. Appl. No. 11/135,600, filed May 23, 2005.

A. Zinin et al., "Alternative Implementations of OSPF Area Border Routers", Apr. 2003 Request for Comments 3509.

The International Engineering Consortium, "Synchronous Optical Network (SONET)", <http:www.iec.org>.

Cisco Systems, Inc., "SONET Automatic Protection Switching on the BPX 8600 Series", 1982-2003.

* cited by examiner

BACKUP PATH CONVERGENCE IN THE APS ENVIRONMENT

RELATED APPLICATIONS

U.S. patent application Ser. No. 11/135,600 entitled HIERARCHICAL LABEL DISTRIBUTION FOR INTER-AREA SUMMARIZATION OF EDGE-DEVICE ADDRESSES, filed on May 23, 2005.

U.S. patent application Ser. No. 10/928,866 entitled MECHANISM TO IMPROVE CONCURRENCY IN EXECUTION OF ROUTING COMPUTATION AND ROUTING INFORMATION DISSEMINATION, filed on Aug. 27, 2004, now published as U.S. Patent Publication No. U.S. 2006/0045024 A1 on Mar. 2, 2006.

Both applications are incorporated herein by reference in their entireties, including the references cited therein.

BACKGROUND OF THE INVENTION

1. Field of the Invention

This invention relates to the switch-over of optical links and consequent rerouting of message packets in routers that terminate the optical links. The invention particularly relates to optical networks using the SONET protocol and particularly those using SONET Automatic Protection Switching (APS 1+1 and APS 1:1) arrangements to switch data traffic from a failed link to a redundant standby link.

2. Background Information

SONET is well known and described in a number of publications, e.g., *Synchronous Optical Network (SONET)*, published by the International Engineering Consortium. Also well known is the use of APS described, for example, in a paper titled *Cisco BPX 8600 Series Switches SONET Automatic Protection Switching (APS)* and articles cited therein. As described in the latter publication, a failure of a working link in a SONET system can be rectified within the system by switching traffic to one or more backup links, generally within a fraction of a second. However, the network routers that terminate the SONET paths must also switch their data paths to the SONET backup path and this process may take substantially longer. For example, in a network using Open Shortest Path First (OSPF) path determination, a change in the path structure for packets passing through a router, requires the router to rebuild the link state data base from which its routing tables are derived. This operation takes a significant length of time: new adjacencies of neighboring routers must be established and those routers must exchange the link-state data bases from which they derive their routing tables. OSPF is described, e.g. in Internet Engineering Task Force Request for Comments 2328.

The rather short interruptions within the optical system due to switching of optical paths can be accommodated by buffering at the receiving end of the data string. On the other hand, the much longer delay resulting from the need to rebuild the link-state data bases in the routers causes an unacceptable delay when the data stream comprises audio or video packets.

SUMMARY OF THE INVENTION

In accordance with the invention, the link state data bases in the routers involved are initially organized to include the paths including the back-up optical links as well as the working links. This is achieved by pre-establishing an adjacency through the APS backup path. More specifically OSPF control packets are carried in SONET's DCC overhead. The paths including the backup links are assigned a higher cost e.g. maximum cost, so that when the routers select among the paths in building their routing tables, they will select the path including the working link and not the backup links. In case of a failure in a working link that requires a switch-over to an external connection to the optical network, there is no time spent in bringing up the new adjacency and synchronizing the databases as the adjacency is already pre-established. Using the Interior Gateway Protocol, this change is propagated to all of the routers, which can then repopulate their routing tables with the links corresponding with the backup paths. This eliminates the time to bring up the adjacency and synchronize the databases in the routers. In turn this drastically reduces the amount of time it takes to change the routing tables and thus reduces the overall time for the system to converge on the new arrangement.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
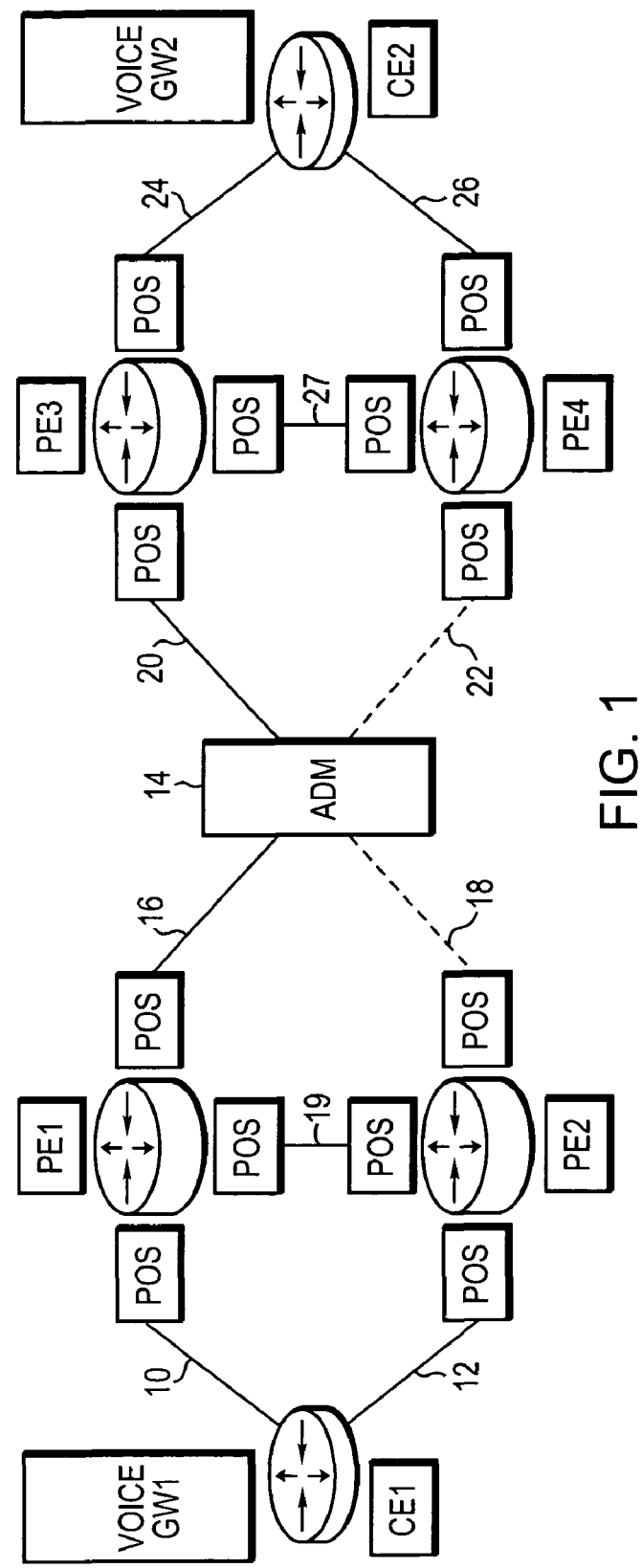
FIG. 1 is a diagram of an optical network in which the invention is used.

FIG. 1 illustrates an optical network to which the invention may be applied. The network carries data between, for example, device gateways GW1 and GW2. These gateways are connected to routers CE1 and CE2, respectively.

Specifically, the router CE1 is connected to a router PE1 by a primary optical link 10 and to a router PE2 by a secondary optical link 12. The router PE1 is connected to an add/drop multiplexer (ADM) 14 by an optical fiber working link 16 and the router PE2 is connected to the ADM 14 by a fiber backup link 18. A link 19 interconnects the routers PE1 and PE2.

Similarly, at the other end the ADM 14 is connected to routers PE3 and PE4 by a working link 20 and a backup link 22, respectively. Routers PE3 and PE4 are connected to router CE2 by a primary link 24 and a secondary link 26. Also a link 27 interconnects the routers PE3 and PE4. The optical links operate in a full duplex arrangement. Thus each link comprises a pair of optical fibers that carry data in opposite directions. The conversions between the internal electrical structures of the routers and the optical signals carried in the respective fiber links are provided by suitable "POS" units.

Figure 3:
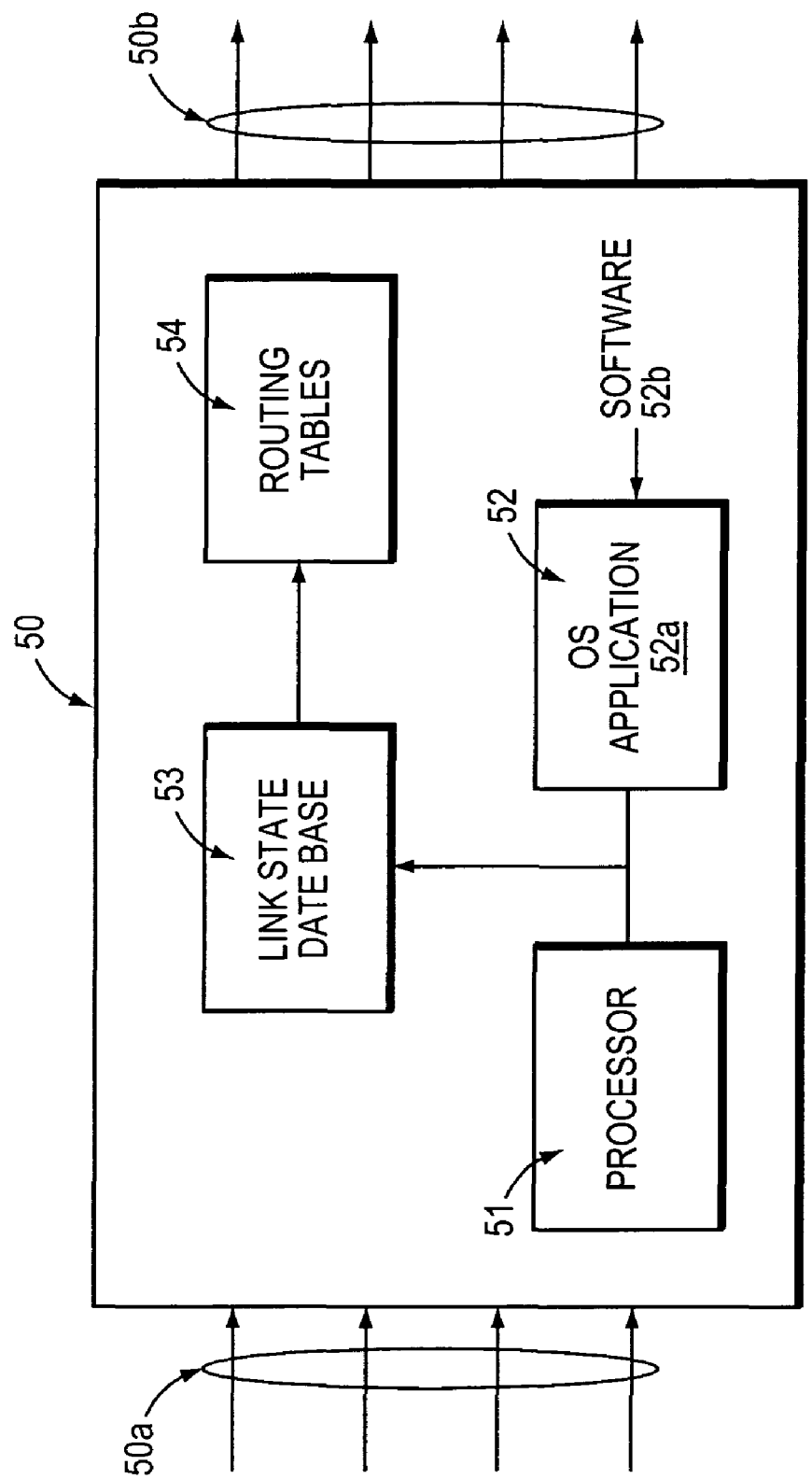
FIG. 3 is an abbreviated diagram of a router that borders the network of FIG. 1.

FIG. 3 is a simplified diagram of a router 50 used in connection with the invention. The router receives IP packets on input lines 50*a* and forwards them over output lines 50*b*. The router includes a processor 51 that operates in conjunction with a system memory 52 containing an operating system 52*a* and application software 52*b*. Another memory 53 contains a link state data base and a memory 54 contains the routing tables. Under direction of the software 52, the processor derives the contents of the routing tables from the link state data bases. While the memories 52, 53 and 54 are separately depicted, they will ordinarily comprise portions of a single memory.

For the sake of simplicity the switching fabric and packet classification structure in the router 50 have been omitted from the drawings. However, it should be noted that an input on a line 50a carrying the IP address of the router is processed by the router in accordance with the contents of its header.

OSPF adjacencies are established between the working routers PE1 and PE3, the routers PE1 and PE2, and the routers PE3 and PE4, these routers terminate the optical paths described herein. Thus all of these routers contain identical link state data bases from which they derive their routing tables.

In addition to the foregoing conventional arrangement, backup adjacencies are pre-established between the router PE2 and PE3, between the routers PE1 and PE4, and the routers PE2 and PE4. These latter backup adjacencies are also included in the link state data bases, but are assigned higher costs (e.g. maximum cost) than the working adjacencies.

In accordance with the SONET protocol, the routers PE1-PE4 and the ADM 14 frame the data they transmit over the optical links and they deframe the frames they receive over those links. Specifically, although the data is physically transmitted serially, it is organized conceptually in frames, such as illustrated in FIG. 2.

Figure 2:
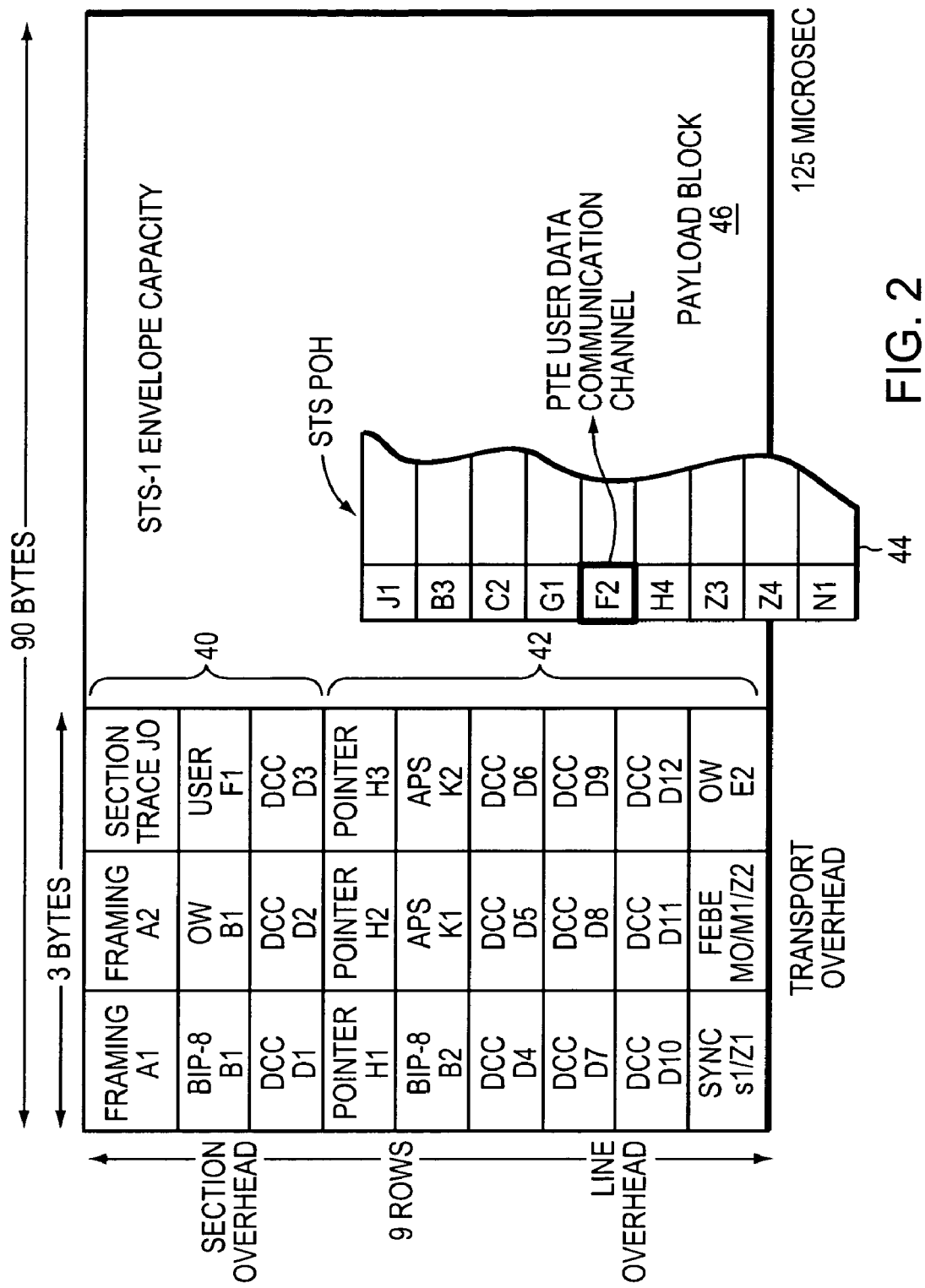
FIG. 2 is a diagram of a SONET frame that is transmitted over the network of FIG.

As shown in FIG. 2, each frame is 90 bytes long by 9 bytes deep. It is transmitted serially, row by row. The first three columns contain transport overhead bytes and the remaining eighty-seven contain the bytes of the payload. The block 40 contains section overhead bytes, block 42 contains line overhead bytes. The column 44 in the payload block 46 contains path overhead bytes.

The remainder of the frame, eighty-six columns, contains the data payload. The blocks 40 and 42 and the column 44 contain information and instructions for devices that terminate the various portions of the SONET network. When transmitting data over the optical links, the devices frame the SONET data, inserting the overhead bytes, and when they receive the frames from the optical links they deframe the SONET data, interpret the overhead bytes that may be directed to them and take any action required by the interpreted bytes.

Of particular importance in connection with the present invention is the F2 overhead byte in the column 44. This byte is a user data communication channel for messages sent to the various optical network devices. Frames are generally transmitted at a rate of 8,000/second. Accordingly, the F2 byte is part of the data stream of 8,000 bytes/second, i.e. 64,000 bits/second. Preferably the messages transmitted in this fashion are formatted according to the internet protocol (IP) and, further the transmission control protocol (TCP). For example, the routers PE1-PE4 use such messages to establish adjacencies and exchange link-state data bases.

Assume that the routers in FIG. 1 have been organized so that the path between routers CE1 and CE2 passes through the link 10, router PE1, working link 16, ADM 14, link 20, router PE3 and link 24. Suppose also that working link 16 fails. This will be sensed by the ADM 14 which, in accordance with the APS, will very quickly connect the backup link 18 to the link 20. It will also cause the SONET path to pass from router PE1 to router PE2 to router PE3, thus substituting the backup link 18 and the link 19 for the failed link 16. In the usual OSPF arrangement, the routers PE2 and PE3 will have to exchange their link state databases and then rebuild their routing tables. The interruption in the data stream caused by this operation is much longer than the switchover of links directly accomplished by the ADM 14. Indeed it is longer than is acceptable for voice and video transmissions.

The invention shortens the time required for switching from link 16 to the links 19 and 18 by initially including in the link state databases the entries relating to the backup path, i.e. links 18 and 19. Specifically, the router PE2 uses the F2 byte to transmit OSPF control packets to router PE3 in order to pre-establish an adjacency. When a link in the working path fails, the routers are instructed to reduce the costs associated with the backup links. There is no need to establish new adjacencies and exchange link state data bases. They thus reconstruct their routing tables without having to rebuild their databases.

Failure of the working link 20 is handled in the same way, with the path from router PE1 to the router PE3 traversing links 16, 22 and 27. If both working links 16 and 20 fail, the path will traverse links 19, 18, 22 and 27.

Figure 4:
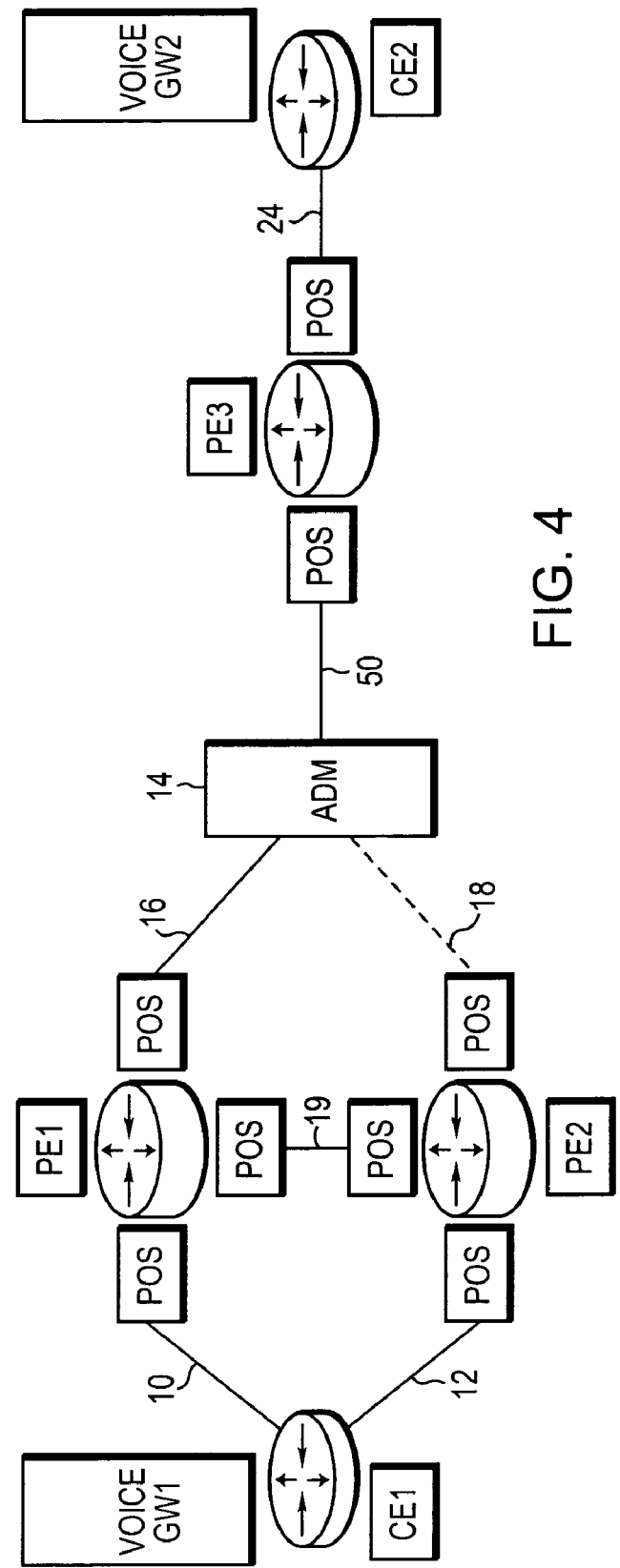
FIGS. 4 and 5 are modified versions of the network of FIG. 1.

FIG. 4 illustrates a variation of the network of FIG. 1. The ADM 14 and the units to the left thereof in FIG. 3 are the same as their like-numbered counterparts in FIG. 1. However, there is a single working link 50 between the ADM 14 and the router PE3, with the link 24 extending between the routers PE3 and CE2.

Figure 5:
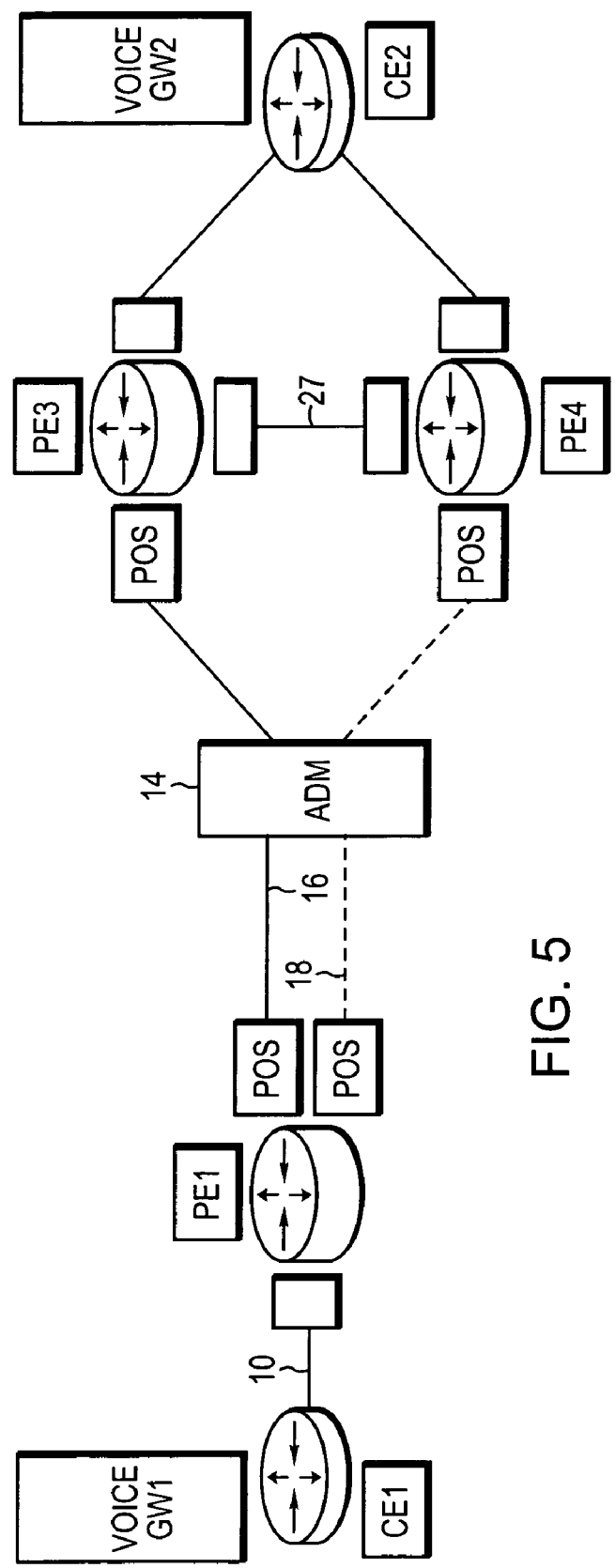

FIG. 5 illustrates another variation in which the elements ADM 14 and the elements to the right thereof are the same as in FIG. 1. However, both link 16 and the link 18 connect the ADM 14 to the router PE1. The latter in turn is connected to the router CE1 by the single link 10.

With the topology shown in FIG. 5, or in general when a PE router has to establish two adjacencies over a (POS) link, OSPF network type point-to-multipoint should be used. This is because only one adjacency can be established over a point-to-point link. When the link is backed up, the adjacency is advertised with the next metric (0xFFFF) and when the link becomes active, the corresponding link metric should be advertised. This will ensure that the traffic will not be attracted toward the protected link in normal cases.

With the topology shown in FIG. 5, where the working and protected links terminate at the same router PE1, it is required that the router have two different IP addresses for the respective links. Otherwise the OSPF control packets cannot be distinguished between the two adjacencies.

What is claimed is:

1. A method of shifting to a backup path in a Synchronous Optical Network (SONET) network including working links and backup links, each of said links being terminated at one end by a router, each router having a link state database and a routing table, the method comprising:
   in each router,
      initially populating the link state database with links that include both the working links extending from the router and the backup links extending from the router, and
      attaching a higher cost to the backup links so that the router selects the working links and none of the backup links for use in routes in the router's routing table; and
   in the SONET network,
      pre-establishing an Open Shortest Path First (OSPF) adjacency over the backup links, and
      when a failure of a working link is detected, switching to a backup link to bypass the working link, by notifying the routers terminating the working and backup links that they should change the costs of the backup link so that the routers change their routing tables to specify the backup link instead of the failed working link.

2. The method of claim 1 in which the routers are configured to pre-establish the OSPF adjacencies using SONET Data Communication Channel (DCC) overhead bytes.

3. The method of claim 1 in which the routers are configured to pre-establish the OSPF adjacencies by sending OSPF control packets in one or more overhead bytes in SONET frames.

4. An apparatus comprising:
a first optical output line configured to transmit to a working link in a Synchronous Optical Network (SONET) network;
a second optical output line configured to transmit to a backup link for the working link in the SONET network;
a memory configured to store a routing table and a link state database, the link state database comprising a first cost associated with the working link and a second cost associated with the backup link, wherein the first cost is initially lower than the second cost; and
a processor configured to: i) pre-establish an Open Shortest Path First (OSPF) adjacency over the backup link by sending OSPF control packets to the backup link in one or more overhead bytes in SONET frames, ii) select the working link for the routing table in response to the lower first cost, ii) change the second cost, in response to a failure of the working link, so that the second cost is lower than the first cost, and iv) select the backup link for the routing table in response to the lower second cost v) utilize the pre-established OSPF adjacency with the backup link.

5. The apparatus of claim 4 wherein the second cost is initially a maximum cost.

6. The apparatus of claim 4 wherein the one or more overhead bytes in SONET frames are F2 overhead bytes in SONET frames.

7. The apparatus of claim 4 wherein the processor is further configured to change the second cost to a corresponding link metric.

8. The apparatus of claim 4 wherein the processor is further configured to detect the failure of the working link.

9. The apparatus of claim 4 wherein the SONET network is configured to implement automatic protection switching (APS).

10. The apparatus of claim 4 wherein the processor is further configured to establish an OSPF adjacency over the working link.

11. The apparatus of claim 4 wherein the processor is further configured to pre-establish the OSPF adjacency over the backup link prior to failure of the working link.

12. A method comprising:
establishing a working link in a Synchronous Optical Network (SONET) network;
establishing a backup link in the SONET network;
pre-establishing an Open Shortest Path First (OSPF) adjacency over the backup link by sending OSPF control packets over the backup link in one or more overhead bytes in SONET frames;
storing, in a router, a first cost associated with the working link and a second cost associated with the backup link, wherein the first cost is initially lower than the second cost;
in response to the initially lower first cost, initially selecting the working link for use in a routing table of the router;
in response to a failure of the working link, changing the second cost, so that the second cost is lower than the first cost; and
in response to the lower second cost, selecting the backup link for use in the routing table, the backup link to utilize the pre-established OSPF adjacency.

13. The method of claim 12, wherein the one or more overhead bytes in SONET frames are F2 overhead bytes in SONET frames.

14. The method of claim 12, establishing an Open Shortest Path First (OSPF) adjacency over the working link.

15. The method of claim 12, wherein the pre-establishing is performed prior to failure of the working link.

16. The method of claim 12, further comprising:
detecting, by the router, the failure of the working link.

17. The method of claim 12, wherein the second cost is initially a maximum cost.

18. The method of claim 17, wherein the second cost is 0xFFFF.

* * * * *